United States Patent [19]

Ertz, III

[11] Patent Number: 4,751,398

[45] Date of Patent: Jun. 14, 1988

[54] LIGHTING SYSTEM FOR NORMAL AND EMERGENCY OPERATION OF HIGH INTENSITY DISCHARGE LAMPS

[75] Inventor: Alexander L. Ertz, III, Collierville, Tenn.

[73] Assignee: The Bodine Company, Collierville, Tenn.

[21] Appl. No.: 840,896

[22] Filed: Mar. 18, 1986

[51] Int. Cl.⁴ .......................... H02J 7/00; H02M 5/45
[52] U.S. Cl. ........................................ 307/66; 307/44; 363/37; 315/86
[58] Field of Search ............... 307/44, 45, 46, 58, 307/64, 66; 363/37, 56, 69, 70, 71; 315/DIG. 2, DIG. 5, DIG. 7, 86

[56] References Cited

U.S. PATENT DOCUMENTS

| | | | |
|---|---|---|---|
| 3,819,980 | 6/1974 | Mullersman | 315/86 |
| 3,823,358 | 7/1974 | Rey | 307/66 X |
| 3,836,815 | 9/1974 | Herzog | 307/66 X |
| 3,925,772 | 12/1975 | Miller et al. | 307/66 X |
| 4,087,697 | 5/1978 | Johnson | 307/66 |
| 4,238,690 | 12/1980 | Clarke | 307/44 |
| 4,313,060 | 1/1982 | Fickenscher et al. | 363/37 X |
| 4,354,118 | 10/1982 | Spencer | 307/66 |
| 4,392,087 | 6/1983 | Zansky | 315/219 |
| 4,395,639 | 6/1983 | Bring | 307/66 |
| 4,451,773 | 5/1984 | Papathomas et al. | 363/69 X |
| 4,477,748 | 10/1984 | Grubbs | 315/DIG. 2 X |
| 4,506,766 | 3/1985 | Watanabe | 363/37 X |
| 4,562,522 | 12/1985 | Adams et al. | 363/56 X |

FOREIGN PATENT DOCUMENTS 0035568 2/1984 Japan ..................................... 363/56
2111326 6/1983 United Kingdom .................. 307/66

OTHER PUBLICATIONS

Widelite Brochure, "Transistorized Arc Control Systems", undated.
Bodine Brochure, "Emergency Lighting", 1981.
Bodine Brochure, "Bodine Trans-Bal Inverter Ballasts", 1982.
General Electric Brochure, "Steadilux Ballasted Industrial Luminaires", undated.

Primary Examiner—William M. Shoop, Jr.
Assistant Examiner—Sharon D. Logan
Attorney, Agent, or Firm—Spensley Horn Jubas & Lubitz

[57] ABSTRACT

A lighting system is provided having a central power supply which includes an AC to DC converter. The DC power is distributed to a plurality of ballast circuits for discharge lamps. Each ballast circuit includes an inverter circuit for inverting the DC power to AC power of sufficient voltage to operate the associated lamps. Should the AC input power for the central power supply fail, batteries may be provided to supply the DC power continuously without interruption.

The inverter circuits are operated at high frequency to reduce audible noise and eliminate noticeable strobing. The inverter circuit includes a switching circuit controlled by a pulse train. The duty cycle of the pulse train is controlled in accordance with a composite feedback signal which is the product of signals representative of the lamp operating voltage and lamp current.

5 Claims, 5 Drawing Sheets

LIGHTING SYSTEM FOR NORMAL AND EMERGENCY OPERATION OF HIGH INTENSITY DISCHARGE LAMPS

BACKGROUND OF THE INVENTION

1. Field of the Invention

The present invention relates to normal and emergency lighting systems, and more particularly, to such lighting systems for operating high intensity discharge lamps.

2. Background Information

High intensity discharge (HID) lamps such as mercury, metal halide and high pressure sodium lamps, are often used to provide outdoor (and in some instances indoor) lighting because of their high efficiency. However, should the power normally supplied by the utility company fail, emergency lighting is often provided by a separate, auxiliary lighting system with its own power source. Such auxiliary lighting systems typically include a power source control circuit which detects the loss of AC power from the normal power source, and switches in a backup power source such as a set of batteries.

Emergency lighting is often not provided by the HID lamps themselves because the detection of the AC power failure and the subsequent transfer from the normal source to the backup source is typically not quick enough to maintain arc conductance in a hot HID lamp. Consequently, the HID lamp "goes out" upon the initial loss of power and usually cannot be restarted until the lamp has been allowed to cool. This cooling period can be as long as 15 minutes depending upon the lamp type, temperature, starting voltage and other factors. Thus it may not be possible to restore normal lighting until after the cool down period which may be much longer than the actual duration of the disruption of power.

Many emergency lighting systems have utilized incandescent lamps as backup lamps for the HID lamps. However, incandescent lamps generally are not as efficient as HID lamps and therefore can require a much larger battery capacity to match the illumination provided by comparable HID lamps.

Another lamp which can be used as a backup lamp for HID lamps is a fluorescent lamp. However, fluorescent lamps while more efficient, are discharge lamps and require their own ballasts. Ballast circuits for discharge lamps provide a high initial voltage potential to initiate arc conductance, and can add to the expense of the emergency lighting system.

Separate backup lamps can also require additional mounting fixtures which can be both expensive and unsightly. Alternatively, the backup lamps may be installed within the HID fixture, but such an arrangement often disrupts the light distribution of both the HID lamp and the backup lamp, and can cause higher operating temperatures.

To enable the use of the same HID lamps to provide both the normal and emergency lighting, some previous lighting systems have proposed the use of uninterruptable power supplies which maintain AC power regardless of the condition of the utility source. Such uninterruptable power supplies typically include a rectifier to convert the AC power from the utility source to DC power and a central inverter to reconvert the DC power back to AC power which is distributed to the ballasts for each individual HID lamp. Should power from the utility source fail, a battery supplies DC power to the central inverter so that the supply of AC power to the HID lamp ballast is not interrupted.

One disadvantage of such an arrangement is that if the central inverter fails, all of the HID lamps supplied by the central inverter fail as well, and the emergency lighting is lost. In addition, because the inverter usually operates at low frequency (typically 60 Hz), the inverter often requires large, heavy and expensive components. Likewise, the individual ballasts of the HID lamps also tend to be large and heavy as a result of the low frequency operation. Still further, low frequency operation of the inverter and the ballast can create significant and therefore distracting audible noise.

Still another disadvantage of such previous systems is that the HID lamps are typically operated at full power in the emergency mode. This can require additional battery capacity, and can create a high glare illumination pattern. Moreover, the overall system efficiency is often low.

As previously mentioned, discharge lamps typically have a ballast circuit between the power source and the lamp itself to provide a high initial voltage potential to start the lamp and further to limit the arc current of the lamp to a safe level. Furthermore, many ballast circuits are provided to regulate the lamp power to within standard limits (per ANSI C78.1350).

One prior ballast circuit for current limitation and power regulation includes an impedance in series with the lamp. This series impedance often takes the form of one or more passive reactive circuit elements such as an inductor. Such a prior ballast circuit can limit arc current to safe levels, but typically does not employ feedback to adjust the level of ballast impedance to regulate the lamp power against changes in the input line voltage which can often vary as much as ±10% from the nominal line voltage. Furthermore, these prior ballast circuits also frequently do not regulate lamp power against changes in the lamp operating voltage which can rise by a factor greater than 50% over the life of the lamp.

Other ballast circuits have been used which include a transformer in which the core saturation is controlled to offset variations in the input line voltage or lamp operating voltage. However, such ballast circuits have often been only partially effective in providing lamp power regulation.

As a result, power regulation is often relatively loose resulting in large variations in light output as the input voltage varies or as the lamp ages. Furthermore, the life of the lamp can be often degraded when operated at greater than the rated power level.

Still further, these passive reactor ballasts tend to be large, heavy and noisy due to their relatively low frequency of operation. Moreover, the light output often strobes at twice the line frequency of the power source, which can not only be distracting, but can also be dangerous if used to illuminate areas in which rotating machinery is operated.

Other ballast circuits have used hybrid combinations of electronic control circuitry and magnetic reactors to give tighter lamp power regulation through the use of feedback control. For example, current in an additional winding of the magnetic reactor core has been used to vary the effective impedance of the main lamp current paths.

These ballast circuits, like the passive reactor ballast, are also operated at relatively low frequency and therefore similarly tend to be large, heavy and noisy. Moreover, the regulating technique can create current harmonics in the power supply wires which may effect the operation of other devices supplied by the same power source. Furthermore, the overall power factor of the lighting system can be relatively low, requiring a higher current to be supplied.

SUMMARY OF THE INVENTION

It is an object of the present invention to provide an improved lighting system which eliminates the need for auxiliary lamps or a central inverter uninterruptable power source.

It is a further object of the present invention to provide an improved lighting system in which the lamps of the system may be operated at reduced power to conserve battery capacity during emergency operation.

It is still a further object of the present invention to provide a more reliable lighting system for both normal and emergency operation.

It is another object of the present invention to provide a small lightweight ballast for a discharge lamp, which is both quiet in operation and has improved power regulation.

It is a further object of the present invention to provide a ballast for a discharge lamp in which operating safety and lamp life are improved These and other objects and advantages are achieved in a lighting system which includes an input circuit for converting AC input power into DC power which is distributed to a plurality of discharge lamps of the system. Each lamp has an inverter circuit which converts the DC power from the input circuit to high frequency AC power to operate the lamp.

Should the AC input power fail, a central battery provides DC power to each of the lamp inverter circuits so that the operation of the lamps is uninterrupted. In the illustrated embodiment, a diode prevents the battery from discharging into the inverter circuits until the AC input power fails. In this manner, the need for a monitor to detect the failure of the AC input power has been eliminated. Moreover, failure of one of the lamp inverter circuits does not affect the operation of the remaining lamp inverter circuits so that continued operation of the remaining lamps is assured.

In another aspect of the present invention, the inverter circuit of each lamp comprises a switching circuit coupled to a voltage stepup transformer which generates sufficient open circuit AC voltage to operate the lamps. The inverter circuit further comprises sensors to sense the lamp operating current and voltage to regulate the average lamp power. In the illustrated embodiment, the duty cycle of the switching circuit is controlled by a control signal which is a function of the product of the lamp operating current and voltage, to tightly regulate the lamp operating power.

As a result, the output of the lamps is maintained at a steady level such that fewer fixtures may be used for a predetermined illumination level. Furthermore, the power drawn from the utility source is relatively constant. Still further, the switching circuit can be operated at a relatively high frequency to eliminate audible hum and to eliminate potentially distracting and dangerous light strobing.

DETAILED DESCRIPTION OF THE DRAWINGS

Figure 1:
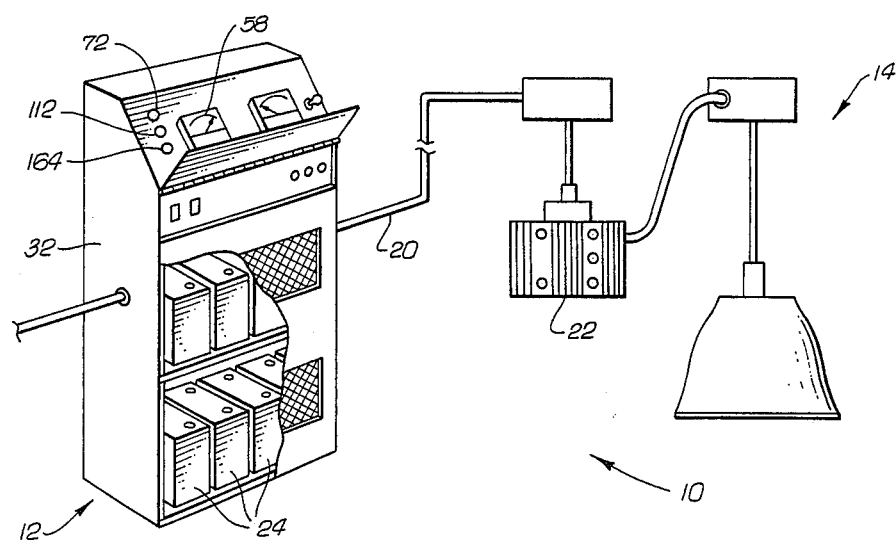
FIG. 1 is a pictorial view of a normal/emergency lighting system in accordance with a preferred embodiment of the present invention.
Figure 2:
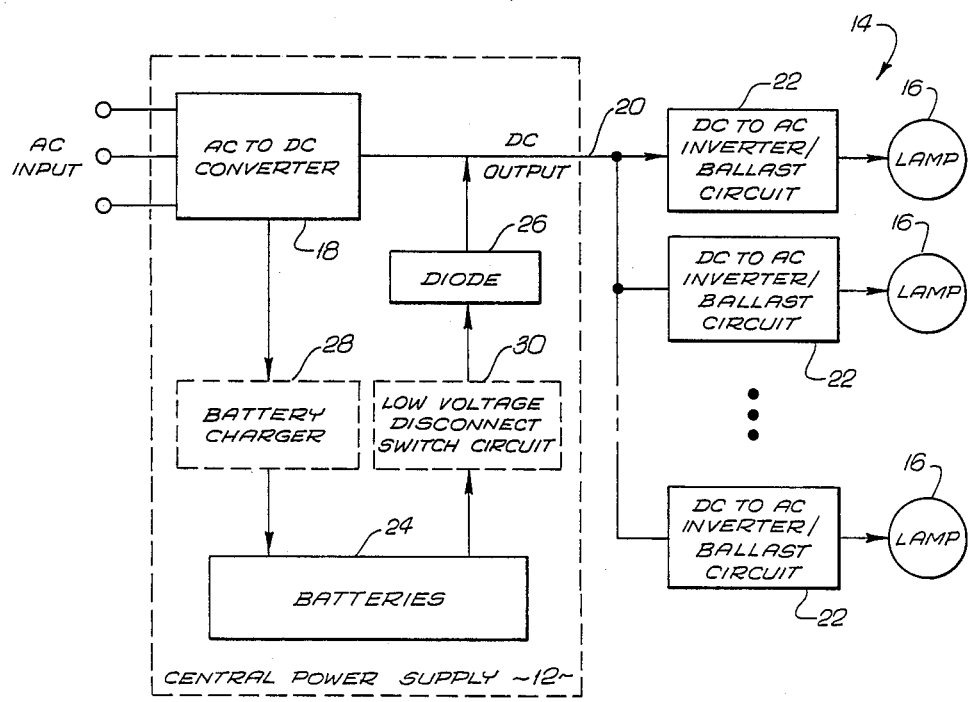
FIG. 2 is a schematic diagram of the lighting system of FIG. 1.

Referring first to FIGS. 1 and 2, a lighting system in accordance with a preferred embodiment of the present invention is indicated generally at 10. The lighting system 10 includes a central power supply 12 which supplies power to a plurality of lamp fixtures 14. In the illustrated embodiment, each lamp fixture 14 has a high pressure sodium discharge lamp 16. It is recognized that the lighting system 10 may be used with other types of high intensity discharge lamps such as metal halide, mercury and high pressure sodium lamps.

The central power supply 12 includes an AC to DC converter circuit 18 which converts AC input power typically provided by a utility company, to DC output power on a common output line 20 to each of the lighting fixtures 14. Each lighting fixture 14 further comprises a DC to AC inverter/ballast circuit 22 (hereinafter ballast circuit 22) which converts the DC output power from the central power supply 12 to a high voltage AC power to operate the associated discharge lamp 16 of the fixture 14.

In the illustrated embodiment, each ballast circuit 22 converts the input DC power to AC power at a high frequency, well beyond the audible range, so that there is no distracting hum emitted by the ballast circuit 22. Moreover, as will be described in greater detail below, the individual components of the ballast circuit 22 may be relatively small and lightweight as a result of the high frequency operation.

The lighting system 10 can operate in two modes: normal and emergency. In the normal mode, the energy to operate the lamp 16 is provided by the AC input power from the utility as described above. However, should the utility AC power fail, the central power supply 12 has a plurality of batteries 24 to supply the required DC output power to each of the ballast circuits 22 such that the operations of the lamps 16 are not interrupted. During normal operation, the DC output power of the AC to DC converter circuit 18 is at a sufficiently high voltage to reverse bias a diode 26 coupled to the output of the batteries 24. When the utility AC input power fails, the output voltage of the converter circuit 18 begins to drop until the diode 26 is forward biased by the batteries 24. This couples the batteries 24 to the DC output line 20 of the central power supply 12, and the DC power to the ballasts 22 continues without any interruption during the transition. In this manner, the need for monitoring circuits to detect an impending utility power failure and fast switching circuits to switch to an alternate power source before the discharge lamps are extinguished, is eliminated.

The central power supply 12 may have a battery charger circuit 28 coupled to an output of the AC to DC converter circuit 18, to charge the batteries 24 during the normal mode. A low voltage disconnect switch circuit 30 has been provided to disconnect the batteries 24 from the central power supply output line 20 to prevent damage to the batteries should the batteries be drained to a dangerously low level.

Figure 3A:
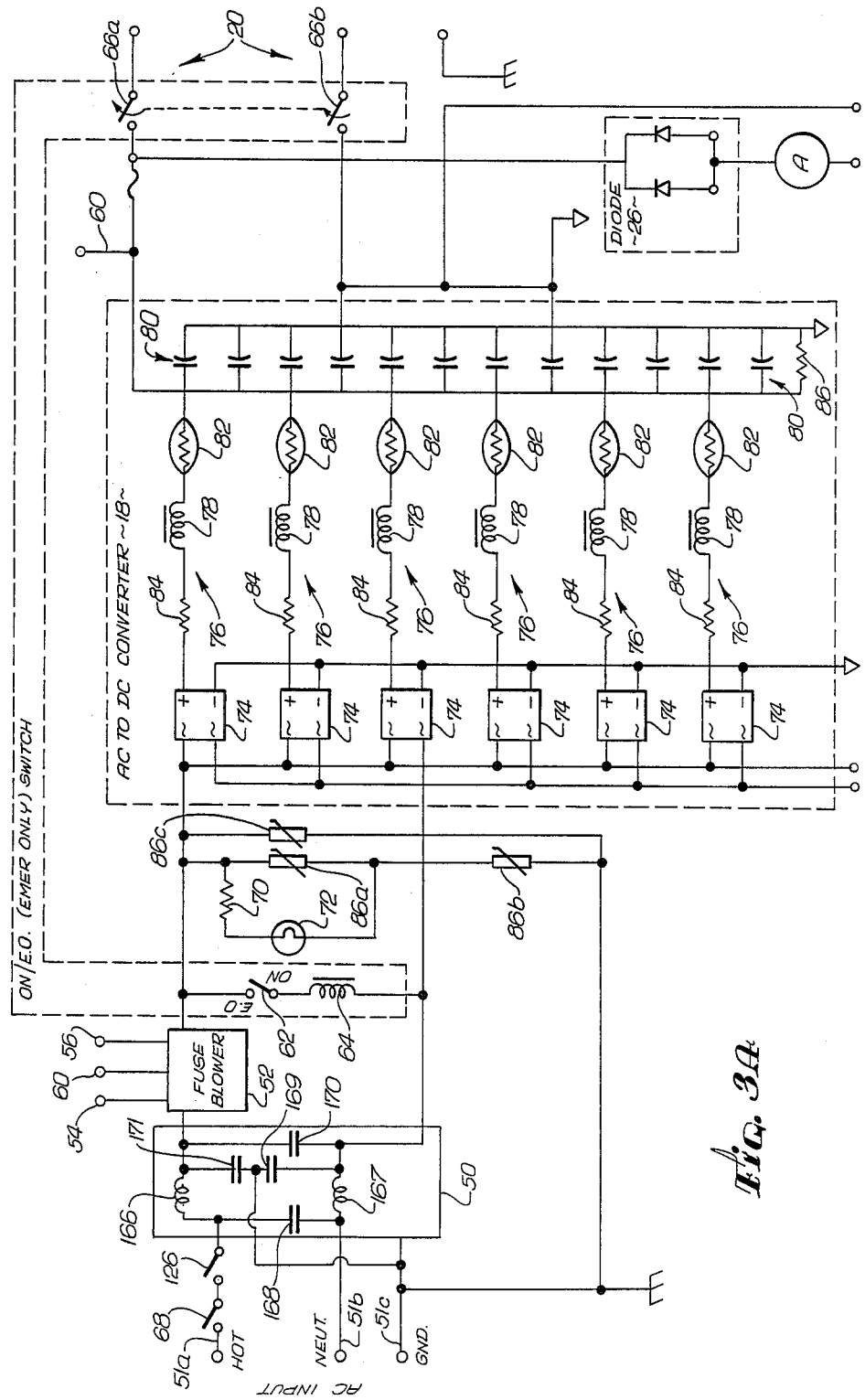
FIGS. 3A and 3B are a schematic diagram of the central power supply circuit of FIG. 2.
Figure 3B:
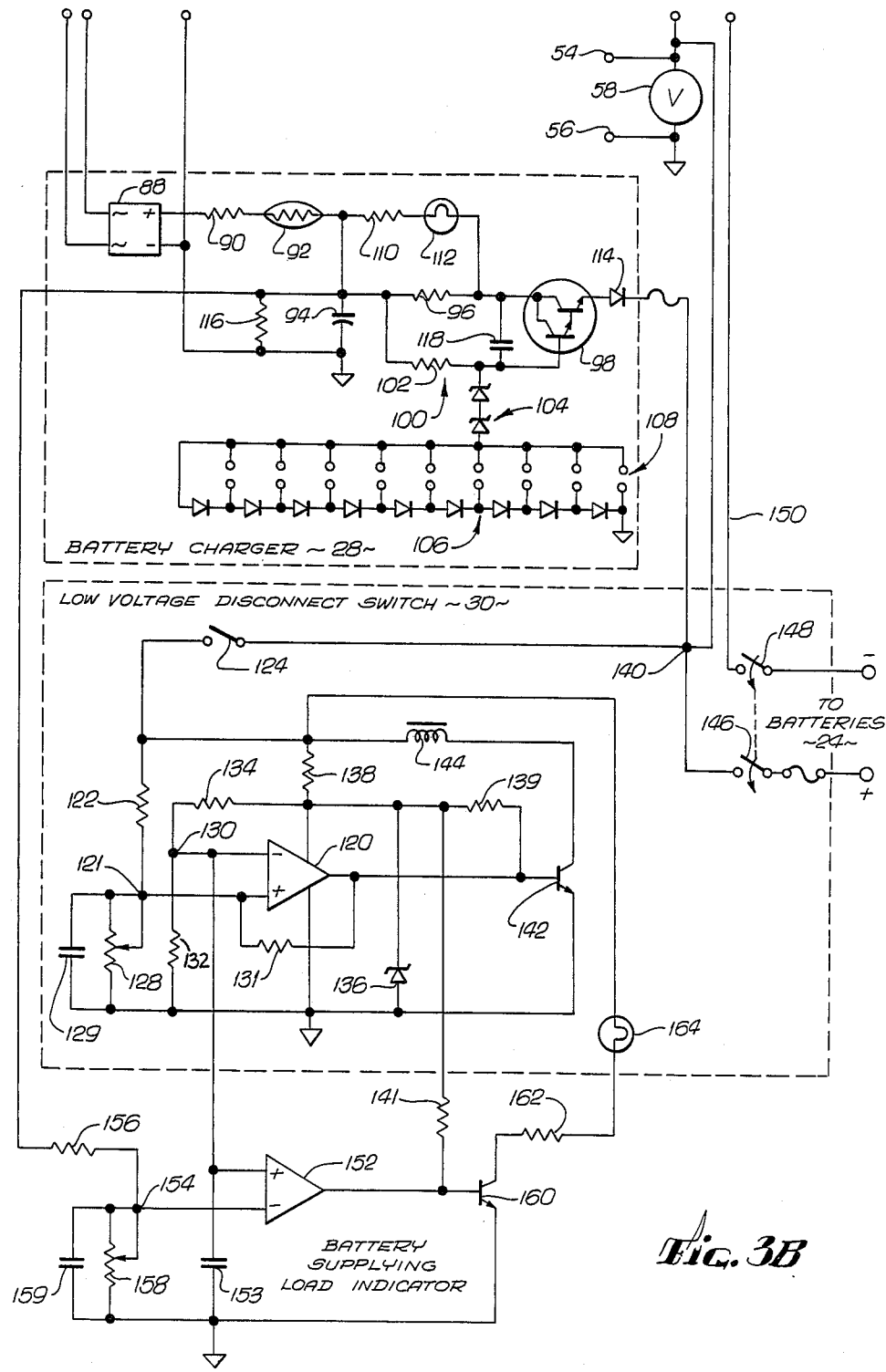

The central power supply 12 may be conveniently housed in a cabinet such as that indicated at 32 in FIG. 1. FIGS. 3A and 3B illustrate the electronic circuitry of the central power supply 12 of the illustrated embodiment in greater detail.

The central power supply 12 includes an electromagnetic interference (EMI) filter 50 coupled to the AC input at 51a–51c. A fuse blower 52 has a pair of inputs 54 and 56 coupled across a voltmeter 58 which monitors the voltage output of the battery charger circuit 28 and the batteries 24. If the battery charger circuit 28 were to fail in such a way that could overcharge the batteries 24, the fuse blower circuit 52 disconnects the AC input from the central power supply 12 before the batteries are charged to a dangerously high voltage. A second input 60 of the fuse blower circuit 52 is coupled to the power supply DC output 20 so that the AC input is also disconnected before an excessively high voltage is output to the ballast circuits 22.

The central power supply 12 further comprises an ON/EMERGENCY ONLY switch 62 which controls the energization of a relay coil 64. In the "E.O." (or emergency only) position, the switch 62 allows the relay coil 64 to be energized, which causes two output switches 66a and 66b to be actuated to the open position as shown in FIG. 3A. In this position, the switches 66a and 66b uncouple the DC output line 20 from the central power supply 12. However, should the AC input power fail, the relay coil 64 will be deenergized, allowing the output switches 66a and 66b to close. Thus, during a power failure emergency, the batteries 24 can supply DC power through the closed switches 66a and 66b through the DC output line 20 to the ballast circuits 22, operating the lamps 16 until AC input power is restored. Alternatively, when the switch 62 is in the ON position, the output switches 66a and 66b remain closed so that DC power is constantly supplied by either the AC to DC converter 18 or, if AC input power has failed, by the batteries 24 such that the lamps 16 are always on. In this mode, the operability of the backup system can be tested by opening a switch 68 which uncouples the AC input power from the AC to DC converter circuit 18.

A series-connected resistor 70 and indicator lamp 72 coupled across the output of the fuse blower 52 indicates whether AC input power is available to the AC to DC converter circuit 18. The lamp 72 may be mounted on the exterior of the cabinet 32 as shown in FIG. 1.

In the illustrated embodiment, the AC to DC converter circuit 18 comprises six full-wave bridge rectifiers 74, the inputs of which are connected in parallel across the outputs of the fuse blower 52. The negative output of each rectifier 74 is connected in common to the other negative outputs of the rectifiers 74. Each positive output of the rectifier 74 is connected to one of six LC filter circuits 76. The LC filter circuits 76 provide a relatively ripple free DC output power to the DC output line 20 when the relay switches 66a and 66b are closed. Each of the LC filter circuits 76 comprises an inductor 78 coupled in series via a thermistor 82 to a pair of parallel connected capacitors 80. The capacitors 80 of each of the LC filter circuits 76 are in turn connected in common such that the AC to DC converter circuit 18 comprises six parallel connected rectifier/LC filter circuits.

It has been found that the parallel connection of six inductors of the LC filter circuits 76 is less expensive than a single inductor rated for the full output current rating, which, in the illustrated embodiment, is 16 amps. Moreover, these six parallel connected inductors are believed to be less bulky and less heavy than a single inductor rated to handle the entire current load. Similarly, the use of a plurality of parallel connected bridge circuits 74 allows smaller rated, less expensive bridge circuits to be substituted for a single, larger rated and relatively more expensive bridge circuit.

The thermistor 82 of each LC filter circuit 76 provides in-rush current protection at startup. Each LC filter circuit 76 further comprises a small resistor 84 which similarly protects against in-rush current should a momentary interruption of power occur. A resistor 86 connected in parallel across each of the capacitors 80 provides a discharge path for the capacitors 80 should the power supply 12 be turned off.

In the illustrated embodiment, the batteries 24 are no maintenance, lead calcium batteries which provide 12 volts each. Eight such batteries are connected in series to provide 96 volts DC. The AC to DC converter circuit 18 provides 125 volts DC which is sufficient to operate the lamps 16 at full power. Thus, when the AC input power is present so that the output of the AC to DC converter circuit 18 is at 125 volts DC, the diodes 26 are reverse biased so that the batteries 24 are electrically uncoupled from the DC output line 20 of the central power supply 12.

Should a power failure occur such that the AC input power is no longer present, the output voltage of the converter 18 begins to drop as the capacitors 80 discharge. Once the converter output voltage falls below the battery output voltage, the diodes 26 are forward biased so that the batteries 24 begin to supply DC output current to the DC output line 20. Accordingly, there is no interruption in the power flow through the DC outout line 20 as the source of DC power changes from the AC to DC converter circuit 18 to the batteries 24. Consequently, the same discharge lamps 16 used for normal illumination may also be used for emergency lighting. There is no need for an auxiliary set of lamps since the transition from the normal to emergency backup mode does not cause the discharge lamps to go out. Furthermore, the need for a separate circuit to monitor the AC input and to detect an impending power failure has been eliminated.

A first varistor 86a is connected across the outputs of the fuse blower 52. Second and third varistors 86b and 86c couple each fuse blower output to the ground input line 51c. The varistors 86a–86c clamp the voltages across these three wire pairs to prevent these voltages from exceeding the voltage ratings of the semiconductor full wave bridge rectifiers 74.

The battery charger circuit 28 includes a seventh full wave bridge rectifier 88 coupled to the outputs of the fuse blower 52. The rectified output voltage of the rectifier 88 is conducted by a resistor 90 and thermistor 92 to a capacitor 94. Because the output of the rectifier 88 is not filtered by an inductor, the capacitor 94 charges to the peak of the AC input voltage of approximately 170 volts in the illustrated embodiment.

A resistor 96 limits the output current of the battery charger 28 and a transistor 98 controls the output current. A control signal at the base of the transistor 98 is provided by a voltage regulator 100 comprising a resistor 102, two series-connected Zener diodes 104 and zero to nine series-connected diodes 106. One of ten incremental control voltages can be selected by the selective placement of a jumper across one of the nine contact pairs 108.

A series connected resistor 110 and indicator lamp 112 are connected in parallel across the current limiting resistor 96. Since the voltage across resistor 96 is proportional to the charging current, the intensity of indicator lamp 112 provides an indication of the charging rate of the battery charger 28. The indicator lamp 112 may be mounted on the exterior of the cabinet 32 as shown in FIG. 1.

A diode 114 protects the transistor 98 from damage by the battery voltage should the AC input power fail. The resistor 90 and thermistor 92 provide in-rush current protection similar to that provided by the resistors 84 and thermistors 82 of the LC filter circuits 76. A resistor 116 connected in parallel to the capacitor 94 provides a discharge path for the capacitor 94 upon failure of the AC input power. A capacitor 118 prevents the transistor 98 from breaking into oscillation at high frequency.

As previously mentioned, the voltmeter 58 monitors the output voltage of the battery charger circuit 28 during the normal mode and the output voltage of the batteries 24 in the emergency mode. The low voltage disconnect switch circuit 30 includes a comparator 120 having a noninverting input 121 connected by a resistor 122 and a switch 124 to the voltmeter 58. The switch 124 and an input switch 126 to the AC input are system on/off switches and are normally closed. The battery charger/battery voltage monitored by the voltmeter 58 and input through the resistor 122 is applied across a variable resistor 128. The voltage across the variable resistor 128 at 121 is compared to a reference voltage provided at a node 130 by a voltage divider resistor pair 132 and 134. The voltage divided by the resistors 132 and 134 is regulated by a zener diode 136 which is connected by a resistor 138 to the battery charger/battery output voltage at node 140.

In the normal mode, the battery charger output is higher than the reference voltage at node 130 such that the comparator 120 turns a transistor 142 on which in turn energizes a relay coil 144. The energization of the relay coil 144 closes a pair of switches 146 and 148 coupling the positive and negative output lines of the batteries 24 to the nodes 140 and 150, respectively, of the central power supply 12.

If the AC input power fails, turning off the battery charger circuit 28, the batteries 24 will initially maintain the node 140 at a sufficiently high voltage such that the comparator 120 maintains the transistor 142 in the ON state. Thus, the switches 146 and 148 remain closed. However, if the power failure lasts too long such that the continued discharge of the batteries 24 causes the voltage at the non-inverting input 121 of the comparator 120 to drop below the reference voltage at node 130, the output of the comparator 120 will change state, turning off the transistor 142 and deenergizing the relay coil 144. This will in turn cause the switches 146 and 148 to open, thereby disconnecting the batteries 24 from the central power supply preventing further and possibly dangerous discharge of the batteries 24.

A second comparator 152 has an inverting input connected to a node 154 which in turn is connected by a resistor 156 to the storage capacitor 94 of the battery charger 28. The voltage at node 154 is applied across a variable resistor 158 and is compared to the reference voltage at node 130.

In the normal mode, the voltage across the capacitor 94 of the battery charger circuit 28 is higher than the reference voltage at node 130 such that the output of the comparator 152 is low. This state turns off a transistor 160 which is connected by a resistor 162 to a third indicator lamp 164. When the capacitor 94 of the battery charger circuit 28 discharges, this indicates that the charger circuit 28 is charging the batteries 24. In which case, the voltage at node 154 drops below the reference voltage at node 130 such that the comparator 152 changes state, turning on the transistor 160 and illuminating the indicator volt 164. The illumination of the indicator volt 164 indicates that the batteries 24 are supplying the energy for the lamps 16. The indicator lamp 164 is also mounted on the exterior of the cabinet 32 as shown in FIG. 1.

Figure 4A:
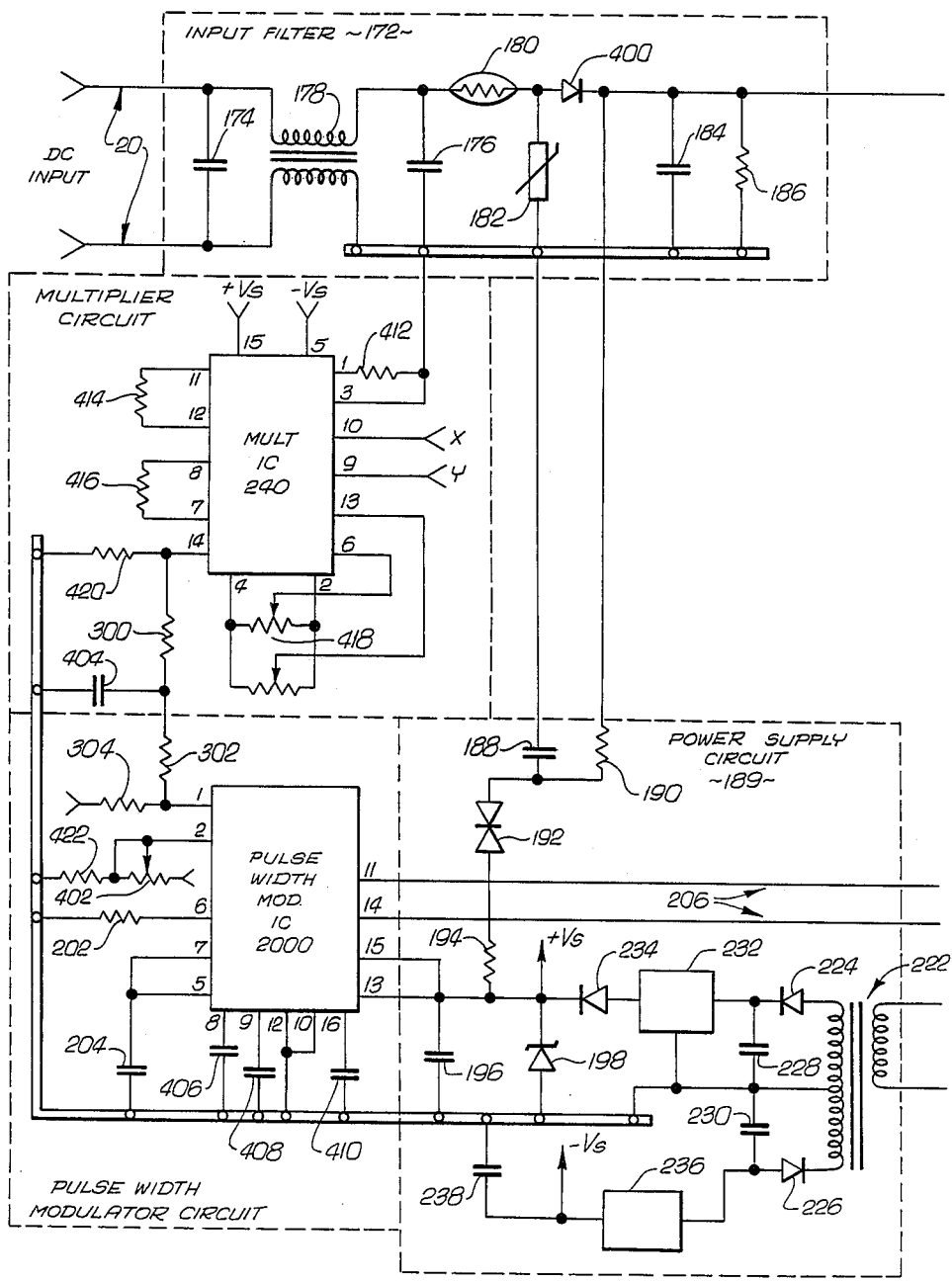
FIGS. 4A and 4B are a schematic diagram of an inverter/ballast circuit of FIG. 2.
Figure 4B:
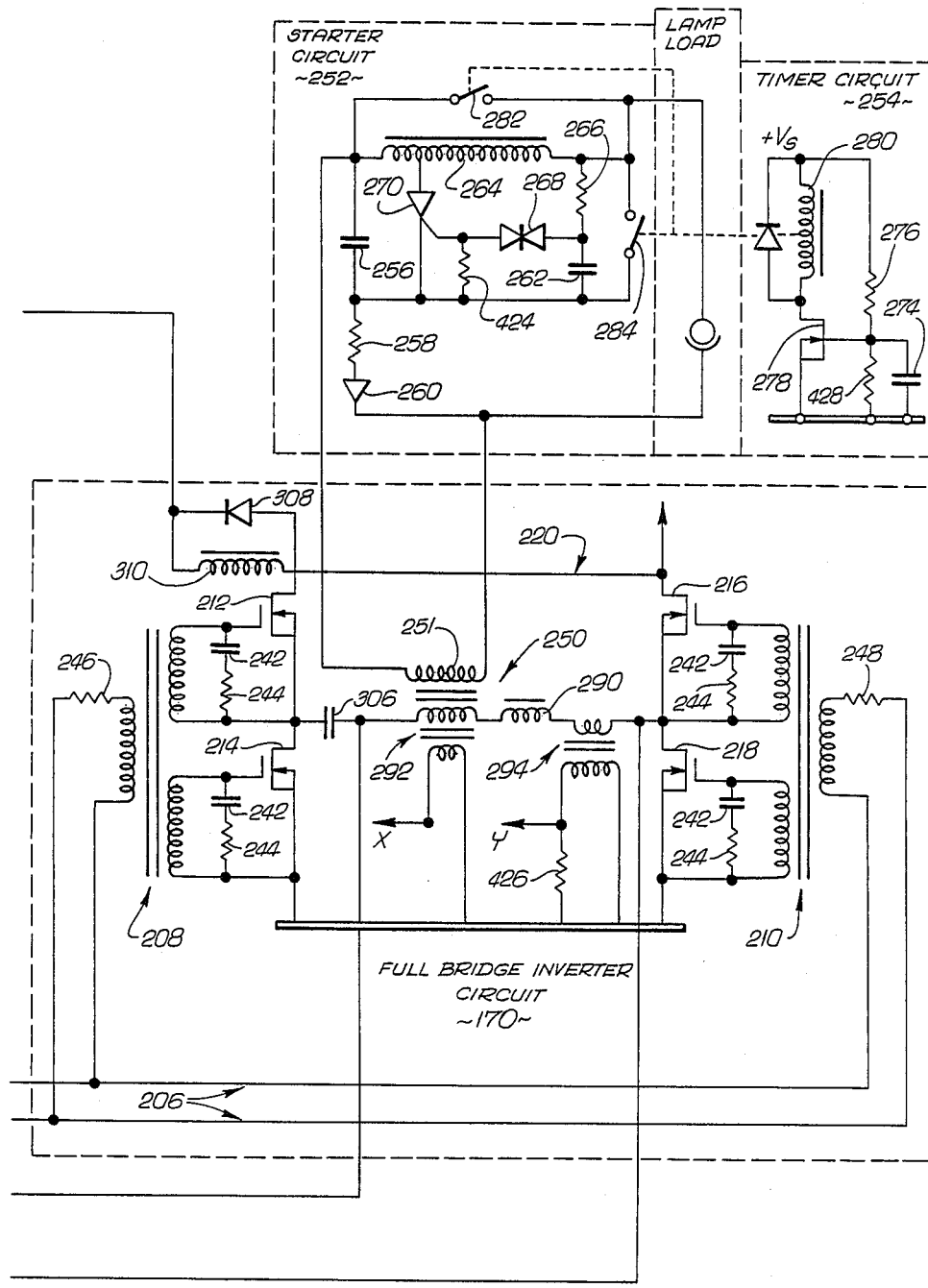

FIGS. 4A and 4B are a schematic diagram illustrating a 250 watt ballast circuit 22 in greater detail. Each ballast circuit 22 includes a full bridge inverter circuit 170 which converts the DC output power of the central power supply 12 to a high frequency AC power to operate a high pressure sodium lamp 16. An input filter circuit 172 includes an input filter capacitor 174 coupled to the DC power lines 20 of the central power supply 12. The capacitor 174 and a second capacitor 176 together with a two winding choke 178 are provided to suppress electromagnetic interference created within the ballast circuit 22 and thereby prevent the electromagnetic interference from propagating back onto the DC power line 20. The capacitors 174 and 176 suppress differential mode conducted emissions and the choke 178 suppresses common mode emissions.

The input filter 172 further comprises a thermistor 180 which limits in-rush current flowing into the ballist 22. A varistor 182 clamps the DC input voltage to a value which is safe for the semiconductor components of the full bridge inverter circuit 170. An input capacitor 184 charges up to the average DC input voltage. A resistor 186 provides a discharge path for the capacitor 184 if the ballast circuit 22 is disconnected from the DC power line 20.

At startup, a capacitor 188 of a power supply circuit 189 charges through a resistor 190 connected to the input capacitor 184. When the voltage on the capacitor 188 exceeds the breakover voltage of a thyristor 192, the charge on the capacitor 188 is dumped through the thyristor 192 and a resistor 194 to a capacitor 196 connected to the power input pins of a pulse width modulator integrated circuit 200. The voltage on the capacitor 196 then rises to a level sufficient for the IC 200 to begin operating. A zener diode 198 clamps the voltage across the capacitor 196 to a safe operating level.

Once the pulse width modulator integrated circuit 200 begins operating, the circuit 200 produces a pulse train, the frequency of which is determined by a timing resistor 202 and a timing capacitor 204. The pulse width modulator circuit 200 has a pair of outputs 206 which are connected to a primary coil of a first isolation transformer 208 of the full bridge inverter circuit 170. The modulator circuit outputs 206 are also connected to a primary coil of a second isolation transformer 210 of the full bridge inverter circuit 170. The transformer 208 has two secondary coils, each of which has a switching transistor 212 and 214, respectively, coupled to the DC input capacitor 184. Similarly, the isolation transformer 210 has a pair of secondary coils coupled to switching transistors 216 and 218, respectively, which in turn are coupled to the DC input capacitor 184.

The square wave pulse train output by the pulse width modulator circuit 200 switches the transistors 212-218 in alternate pairs such that the transistors 212 and 218 are turned on while the transistors 214 and 216 are turned off and vice versa. The operations of the transistors 212 and 218 alternating with the operation of the transistors 214 and 216 creates an AC voltage across center branch 220 between the secondary coils of the transformers 208 and 210 of the full bridge inverter circuit 170.

This AC voltage across the center branch 220 is tapped by the primary coil of a transformer 222, and is stepped down to low voltages by a pair of secondary coils of the transformer 222. The output voltages of the secondary coils of the transformer 222 are rectified by a pair of diodes 224 and 226, respectively, and filtered by a pair of capacitors 228 and 230, respectively, to positive and negative low DC voltages, respectively.

The positive voltage output is regulated by a regulator integrated circuit 232, the $+V_s$ output of which is connected by a diode 234 to the power input pins 13 and 15 of the pulse width modulator IC 200. Thus, after the initial startup, the energy for powering the pulse width modulator IC 200 is supplied by the AC output of the full bridge inverter circuit 170. The power supply circuit 189 converts the AC output to a well regulated DC supply voltage before the charge on the capacitor 188 connected to the input filter circuit 172 is depleted, such that the continuous operation of the pulse width modulator IC 200 is maintained.

A second voltage regulator integrated circuit 236 regulates the negative voltage output of the transformer 222 to provide a negative low DC voltage supply $-V_s$ at a storage capacitor 238. The positive supply voltage $+V_s$ and the negative supply voltage $-V_s$ of the power supply circuit 223 are also used to power a multiplier integrated circuit 240 which will be explained in greater detail below.

As previously mentioned, the input coils of the isolation transformers 208 and 210 of the full bridge inverter circuit 170, are coupled to the output of the pulse width modulator integrated circuit 200 and provide square wave voltages to the gates of the switching transistors 212-218. The output circuit of each secondary coil of the isolation transformers 208 and 210 includes a series-connected capacitor 242 and resistor 244 across the associated secondary output coil to provide a damping network to prevent the gate voltages of the associated switching transistor from swinging to a dangerously high levels. The primary coils of the isolation transistors 208 and 210 have an input resistor 246 and 248, respectively, to limit the instantaneous current flowing out of the gates of the switching transistors 212-218. This ensures that the transistors are switched at a known rate and that the gate currents do not rise to a dangerous level for either the transistors 212-218 or the internal output drive transistors of the pulse width modulator IC 200.

The AC voltage of the center branch 220. of the full bridge inverter circuit 170 is tapped by a transformer 250. A secondary winding 251 of the transformer 250 boosts the AC voltage by approximately a 2:1 ratio to ensure that AC output voltage is sufficiently high to operate the lamp 16 in a stable manner whether the DC input power is provided at 125 volts (normal mode) or at 96 volts (emergency/battery backup mode).

The output of the secondary coil 251 of the transformer 250 is connected to a starter circuit 252 which provides a large momentary voltage spike to initiate arc conductance through the lamp 16. After conductance is initiated, a timer circuit 254 switches the starter circuit out of the ballast output circuit so that the secondary winding of the transformer 250 is connected directly across the lamp 16.

The starter circuit 252 includes a capacitor 256 which charges up to the peak value of the open circuit voltage of the secondary coil 251 of transistor 250 through a resistor 258 and a diode 260. The diode 260 rectifies the output of the secondary coil 251 of the transformer 250 so that the capacitor 256 charges to a positive value.

The voltage across the capacitor 256 charges a second capacitor 262 through an inductor coil 264 and a resistor 266. Once the voltage across the capacitor 262 exceeds the breakdown voltage of a thyristor 268, the charge of the capacitor 262 triggers a silicon controlled rectifier (SCR) 270 which applies the full voltage of capacitor 256 across a few turns of the inductor coil 264. The inductor coil 264 functions as an auto-transformer and boosts the voltage applied across the lamp 16 to the kilovolt range. This voltage is sufficient to ionize the lamp gas and allow current to flow, initiating operation of the lamp 16.

At startup, the positive supply voltage $+V_s$ starts to rise and to charge a capacitor 274 through a resistor 276 of the timer circuit 254. When the voltage across the capacitor 274 rises to a level sufficient to turn on a transistor 278, current flows through a relay coil 280 which actuates a pair of switches 282 and 284 to the closed position. The switch 282 when closed connects the secondary coil 251 of the transformer 250 directly to the lamp 16, bypassing the starter circuit 252. The switch 284 when closed, shorts the capacitor 262 so that no further triggering of the SCR 270 occurs.

The center branch 220 of the full bridge inverter circuit 170 is ballasted by a series-connected inductor 290 which limits the lamp operating current to a stabilized value. In another aspect of the present invention, the lamp operating power is controlled by a composite signal which is the product of two feedback signals designated "X" and "Y". The first feedback signal X is a function of the lamp operating voltage and the second signal Y is a function of the lamp operating current. The feedback signal X is provided by the output of a second secondary coil 292 of the transformer 250. The output voltage of the secondary coil 292 is proportional to the output voltage of the secondary coil 251 of the transformer 250, and hence is proportional to the operating voltage of the lamp 16. The voltage across the coil 292 is scaled in accordance with the number of turns of the coil 292 relative to the secondary coil 251 and the primary coil of the transformer 250.

The second feedback signal Y is provided by the secondary coil of a transformer 294, the primary coil of which is connected in series with the primary coil of the transformer 250. The current through the primary coil of the transformer 250 is directly proportional to the lamp operating current such that the output voltage of the secondary coil of the transformer 294 is also proportional to the lamp current. The output voltage of the secondary coil of the transformer 294 is scaled by the resistor 426 and the ratio of the turns of the secondary coil to those of the primary coil of the transformer 294.

The feedback signals X and Y are input by a linear four-quadrant multiplier integrated circuit 240 which develops a composite feedback signal proportional to the lamp power dissipation using the feedback signals X and Y representative of the lamp operating voltage and current, respectively. This composite feedback signal is a function of the product of the feedback signals X and Y and is coupled by series-connected voltage divider resistors 300-304 to the control signal input of the pulse width modulator IC 200. The coupling resistors 300, 302, 304 and 420 together with the capacitor 404 provide an averaging effect so that the composite feedback signal is proportional to an average of the product of the feedback signals X and Y over several cycles of the inventer output.

The modulation circuit 200 modulates the duty cycle of the pulse train output to the full bridge inverter circuit 170 in accordance with the value of the composite feedback signal output by the multiplier IC 240. In this manner, the output power of the lamp is tightly regulated by the ballast circuit 22 against changes in lamp operating voltage as the lamp ages and against changes in the DC input power resulting from changes in the AC input power from the utility.

The ballast inductor 290 together with the stepup ratio of the transformer 250 and the operating frequency of the inverter circuit 170 define the lamp operating point on the load line of the ballast output curves. The open circuit voltage of the secondary output coil 251 of the transformer 250 is approximately twice the operating voltage of the lamp 16. Small shifts in the operating voltage of the lamp do not cause the current through the lamp to vary to any large extent and such changes in the lamp operating current are in the opposite direction such that this also tends to regulate the lamp operating power.

A blocking capacitor 306 blocks DC circulating currents from building up within the full bridge inverter circuit 170. A diode 308 provides a low resistance path for currents fed back from the full bridge inverter circuit 170 to the input capacitor 184 of the input filter 172. An inductor 310 limits in-rush current to the inverter circuit 170 should switching transistors 212-218 momentarily conduct simultaneously.

Because each lamp fixture 14 has its own inverter ballast circuit 22, the inverter/ballast circuits are unaffected by the failure of one inverter/ballast circuit; and the remaining lamps can continue to provide normal and/or emergency lighting. Moreover, the ballast circuits 22 do not require the full 125 volts DC normally supplied but instead can continue to operate with a lower DC input level. As a result, the battery capacity requirements for the emergency mode of operation can be correspondingly reduced.

The ballast circuit 22 described above regulates the lamp operating power very tightly. Therefore, the lamp illumination level is maintained steadily and fewer fixtures may be used to provide an assured illumination level. Furthermore, lamp life may be improved since the lamp power rating generally will not be exceeded.

In the illustrated embodiment, the full bridge inverter circuit 170 provides AC output power at a frequency of approximately 75 kilohertz to operate the lamp 16. This high frequency of DC to AC inversion allows the use of small, lightweight, components as shown in Appendix A which identifies suggested values for the components described above for the central power supply 12 and the inverter/ballast circuit 22. These component values are identified for purposes of illustration only and are not intended to limit the scope of the invention.

Another advantage of the high frequency DC to AC inversion rate is that the ballast operates outside the audio frequency range such that no audible noise is generated. Moreover, the high frequency operation also eliminates potentially distracting and dangerous light strobing produced by operation at utility line frequencies. Still further, regulation at high frequency allows simpler filtering of current switching harmonics as compared to many previous hybrid regulation methods.

It will, of course, be understood that modifications of the present invention, in its various aspects, will be apparent to those skilled in the art, some being apparent after study and others being merely matters of routine electronic design. For example, other DC to AC inverter circuits which are preferably capable of being duty cycle controlled may also be used. Such other inverter circuits include push-pull and half-bridge inverters. In addition, a high frequency, power regulating inverter/ballast circuit can be used in a lighting system configured for normal operation only. As such, the batteries and charger circuit can be eliminated and the aforementioned AC to DC converter circuit can be maintained in a central location as described above or alternatively incorporated into each ballast/inverter circuit. Moreover, with only minor changes to the ballast circuit, the lighting system can be configured for other discharge lamp types such as metal halide and mercury arc lamps and other wattage levels.

Other embodiments are also possible, with their specific designs dependent upon the particular application. As such, the scope of the invention should not be limited by the particular embodiment herein described but should be defined only by the appended claims and equivalents thereof.

| APPENDIX A | |
|---|---|
| CENTRAL POWER SUPPLY 12 | |
| Transistor 98 | NPN Darlington transistor rated 8 A, 250 V minimum |
| Transistors 142, 160 | NPN transistor rated 1 A, 250 V minimum |
| Silicon Diode Bridges 74 | Rated 10 A, 400 V minimum |
| Silicon Diode 26 | Dual diode rated 30 A, 400 V minimum |
| Zener Diode 104 | 51 V, 5 W |
| Zener Diode 104 | 56 V, 5 W |
| Silicon Diodes 106 | Rated 1 A, 50 V minimum |
| Silicon Diode 114 | Rated 6 A, 400 V minimum |
| Zener Diode 136 | 10 V, 0.5 W |
| Integrated Circuit 120, 152 | Dual comparator, LM393 |
| Varistors 86a-86c | Metal oxide varistor 228 V max, 70 Joule minimum recognized component |
| Inductors 78 | Rated 7-15 mH, 4 amperes minimum, Signal Transformer #C1-2-4 |
| Relay 64 | Listed relay, DPST-NC-120 VAC rated 20 A, 125 VDC minimum |
| Relay 144 | Listed relay, DPST-NO-110 VDC rated 20 A, 125 VDC minimum |
| Thermistor 82 | NTC thermistor rated 7 ohm at 25 degrees C., 4 Amp minimum |
| Resistor 70 | Wirewound resistor rated 2.2 kohm, 12 W, 5% min. |
| Resistor 84, 90 | Wire wound resistor rated 0.5 ohm, 10 W minimum |

-continued

APPENDIX A

| | |
|---|---|
| Resistor 86 | 3.9 to 6.8 kohm, 5 W, 10% |
| Resistor 96 | Wirewound resistor on tubular ceramic core with vitreous enamel coating. Rated 50 ohm, 100 W, 5% minimum. Ohmite #270-100-M-40-50R000J |
| Resistor 102 | 4.7 to 10 kohm, 2 W, 10% |
| Resistor 110 | 820 ohm to 1,5 kohm, 5 W, 10% |
| Resistor 116 | 39 to 56 kohm, 2 W, 10% |
| Resistor 122 | 39 to 51 kohm, 1/2 W, 10% |
| Resistor 131 | 1 M to 20 M ohm, 1/2 W, 10% |
| Resistor 132 | 10 to 22 M ohm, 1/2 W, 10% |
| Resistors 134, 156 | 82 to 150 kohm, 1/2 W, 10% |
| Resistor 138 | 18 to 27 kohms, 2 W, 10% |
| Resistors 139, 141 | 8.2 to 15 kohm, 1/2 W, 10% |
| Resistor 162 | 1.5 to 2.2 kohm, 5 W, 10% |
| Potentiometers 128, 158 | 2 kohm, 1/2 W, 10% |
| Capacitors 80, 94 | Aluminum electrolytic rated 390 uF minimum, 200 V minimum |
| Capacitor 118 | Rated 0.1 uF, 200 V minimum |
| Capacitors 129, 153, 159 | Rated 0.1 uF, 50 V minimum |

EMI FILTER ASSEMBLY 50

| | |
|---|---|
| Capacitor 168 | 1000 to 10000 pF, rated 1000 V minimum |
| Capacitor 169-171 | 0.0068 uF to 0.022 uF, rated 1000 V minimum |
| Inductors 166, 167 | Constructed as follows: A. Core - iron powder material, 2.21" × 1.09" × 0.82", (2) required B. Bobbin - Nylon, 1.42" × 1.61" × 1.42" C. Wire - 24 turns, Bifilar 14 AWG Class 130 enamel insulated magnet wire |

INVERTER/BALLAST 22

| ITEM | DESCRIPTION | MANUFACTURER | PART NUMBER |
|---|---|---|---|
| 200 | IC PWM | MOTOROLA SG3525AN | |
| 240 | IC MULTIPLIER | MOTOROLA MC1494L | |
| 232 | IC +15 VOLT REGULATOR | MOTOROLA | MC78M15CT |
| 236 | IC −12 VOLT REGULATOR | MOTOROLA | MC79L12CP |
| 212-218 | MOSFET TRANSISTOR | INT'L RECT | IRF340 |
| 278 | MOSFET TRANSISTOR | INT'L RECT | IRFD1Z3 |
| 400 | 400 V, 6 A RECTIFIER | MOTOROLA | MR754 |
| 308 | 400 V, 30 A RECTIFIER | VARO | R714X |
| 224 | 400 V, 2 A RECTIFIER | UNITRODE | UES1106 |
| 226, 234 | 400 V, 1.5 A RECTIFIER | DIODE SALES | FR-154 |
| 198 | 16 V, 1 W ZENER | MOTOROLA | IN4745A |
| 260 | 2 k V, 0.5 A RECTIFIER | DIODE SALES | R2000F |
| 270 | 600 V, 3 A SCR | TECCOR | S6003L |
| 192, 268 | DIAC TRIGGER | GENERAL ELECT | ST-2 |
| 180 | NTC THERMISTOR | KEYSTONE CARBON | CL-30 |
| 182 | VARISTOR | GENERAL ELECT | V130LA20A |
| 264, 282, 284 | DPST-NO RELAY | AROMAT | JC2aF-12 VDC |
| 402 | 50 kOHM POTENTIOMETER | BOURNS | 3386R-1-503 |
| 174, 176 | 0.01 uF, 1.5 k V CAPACITOR | ROEDERSTEIN | KP1832/310/15/10% |
| 184, 306 | 5 uF, 200 V CAPACITOR | SPRAGUE | 735P505X9200UTL |
| 406, 404, 242 | 1000 pF CERAMIC CAP | KEMET | C315C102M1R5CA |
| 188 | 10 uF, 63 V POLYEST CAP | ROEDERSTEIN | MKT1813-610-06 |
| 196 | 2.2 uF, 50 V CERAMIC CAP | KEMET | C340C225M5U1CA |
| 288, 262 | 1 uF, 50 V CERAMIC CAP | KEMET | C330C105M5U1CA |
| 230, 238 | 0.1 uF, 100 V CERAMIC CAP | KEMET | C330C104M1U1CA |
| 408 | 0.01 uF, 100 V CER CAP | KEMET | C320C103M1U1CA |
| 204 | 1000 pF, ULTRA-STAB CAP | KEMET | C320C102G1G5CA |
| 256 | 0.22 uF, 630 V POLYPRO CAP | WESTLAKE | KP1.73/0.22 uF/630 VDC |
| 274 | 4.7 uF, 63 V POLYEST CAP | ROEDERSTEIN | MKT1813-547-06 |
| 258 | 270 k, 1/2 W RESISTOR | ALLEN BRADLEY | |
| 186, 266 | 2.7 M, 1/2 W | | |
| 412, 418 | 15 k, 1/2 W | | |
| 414, 416 | 6.8 k, 1/2 W | | |
| 420, 300, 422 | 10 k, 1/2 W | | |
| 302 | 100 k, 1/2 W | | |
| 202 | 8.2 k, 5%, 1/2 W | MEPCO/ELECTRA | 5053EM8K200J |
| 244 | 47 ohm, 1/2 W | A-B | |
| 246, 248 | 10 ohm, 1/2 W | | |
| 424 | 680 ohm, 1/2 W | | |
| 276 | 2.2 M, 1/2 W | | |
| 428 | 10 M, 1/2 W | | |
| 190 | 10K, 1 W | A-B | |
| 426 | 22 ohm, 1 W | | |

I claim:

1. A power supply for normal and emergency operation of discharge lamps, said power supply for use with a source of alternating current (AC) power and a storage battery having a positive terminal and a negative terminal, said power supply comprising:

a pair of output terminals;

converter means coupled to the output terminals, for converting alternating current (AC) to direct current (DC) and for supplying the DC current to the output terminals;

a plurality of inverter means coupled to the output terminals, each inverter means for inverting DC current to AC output current and supplying the AC output current to an associated discharge lamp; and a diode electrically coupling the storage battery to the input of each inverter means when the DC output current of the converter means falls below a predetermined level;

wherein the battery provides DC current to each inverter means through the coupling means when the DC output current of the converter means falls below the predetermined level to thereby maintain the operation of the discharge lamps;

wherein each inverter means comprises:

switch means coupled to the output of the converter means and responsive to an input control signal, for inverting the DC current to AC current for powering a discharge lamp, said lamp AC current having a duty cycle in accordance with the input control signal;

lamp voltage sense means for providing a first output signal proportional to the lamp voltage;

lamp current sense means for providing a second output signal proportional to the lamp current; and multiplier means for providing said input control signal to the switch menas, said input control signal being proportional to the product of the first and second output signals;

wherein the duty cycle of the AC current supplied to the lamp is controlled in accordance with the product of the lamp voltage and lamp current.

2. The ballast circuit of claim 1 wherein the switch means comprises a pair of transistor switches coupled to the output of the converter means and a pulse width modulation means coupled to control inputs of the transistor switches for providing a pulse train to the transistor control inputs to alternatively switch the transistors, said pulse train having a duty cycle in accordance with said input control signal.

3. A power supply for operation of discharge lamps, comprising:

a pair of output terminals;

central converter means for converting alternating current (AC) to direct current (DC) and for supplying the direct current to the output terminals; and a plurality of inverter means coupled to the output terminals each inverter means for inverting DC current to AC output current and supplying the AC output current to an associated discharge lamp;

wherein the central converter means comprises:

rectifier means for rectifying AC input current to DC current; and filter means coupled between the output of the rectifier means and the pair of output terminals, for filtering rippled current from the DC current output of the rectifier means, said filter means including at least two inductors which are coupled in parallel between the output of the rectifier means and one of the output terminals, and capacitor means coupled to the parallel coupled inductors and coupled across said output terminals, for storing charge from the parallel coupled inductors.

4. The converter circuit of claim 3 wherein the rectifier means comprises a plurality of full wave rectifiers, each full wave rectifier having an output coupled to an associated inductor.

5. A central power supply for a plurality of inverter/ballast circuit for discharge type lamps, comprising:

an input for AC power;

a pair of output terminals;

a first full wave rectifier coupled to said AC input; rectifier and coupled to one of said output terminals;

a second full wave rectifier coupled to said AC input;

a second inductor coupled in series with the second rectifier and coupled to said one output terminal;

a third full wave rectifier coupled to said AC input;

and a third inductor coupled in series with the third rectifier and coupled to said one terminal;

wherein the series coupled rectifiers and inductors are coupled in parallel between the AC input and said one output terminal;

said supply further comprising a plurality of capacitors coupled in parallel across the output terminals.

* * * * *